United States Patent [19]

Takahashi et al.

[11] Patent Number: 4,842,342
[45] Date of Patent: Jun. 27, 1989

[54] ANTISKID BRAKE CONTROL SYSTEM BASED ON FUZZY INFERENCE

[75] Inventors: Hiroshi Takahashi, Komae; Yasuki Ishikawa, Zama, both of Japan

[73] Assignee: Nissan Motor Co., Ltd., Yokohama, Japan

[21] Appl. No.: 270,974

[22] Filed: Nov. 14, 1988

[30] Foreign Application Priority Data

Nov. 17, 1987 [JP] Japan .................. 62-291594

[51] Int. Cl.$^4$ .............................. B60T 8/58
[52] U.S. Cl. ........................ 303/102; 303/96; 303/103; 364/424.01; 364/424.02
[58] Field of Search ............ 303/91, 93, 95, 96, 303/100, 102, 103, 104, 105, 106, 107, 108, 109, 111, 20; 188/181, 411; 364/424.01, 424.02

[56] References Cited

U.S. PATENT DOCUMENTS

| | | | |
|---|---|---|---|
| 3,401,985 | 9/1968 | Williams et al. | 303/107 X |
| 4,068,903 | 1/1978 | Straub | 303/107 X |
| 4,750,125 | 6/1988 | Leppek et al. | 303/103 X |
| 4,763,960 | 8/1988 | Uchida et al. | 303/109 X |
| 4,797,825 | 1/1989 | Shimanuki et al. | 303/96 X |
| 4,809,175 | 2/1989 | Hosaka et al. | 364/424.01 |

FOREIGN PATENT DOCUMENTS 51-6305  2/1976  Japan .

OTHER PUBLICATIONS

Zadeh, "Making Computers Think Like People", *IEEE Spectrum*, Aug. 1984, pp. 26–32.

*Primary Examiner*—Douglas C. Butler
*Attorney, Agent, or Firm*—Foley & Lardner, Schwartz, Jeffery, Schwaab, Mack, Blumenthal & Evans

[57] ABSTRACT

An antiskid brake control system of a vehicle includes a detecting section for sensing or estimating various parameters such as vehicle speed, wheel speed, wheel slip rate, first time derivatives of the vehicle speed and wheel speed, and second time derivative of the vehicle speed and wheel speed, a control section for determining a manipulated quantity by a fuzzy inference based on the values of the parameters, and a modulator section for varying a brake fluid pressure in accordance with the manipulated quantity.

3 Claims, 12 Drawing Sheets

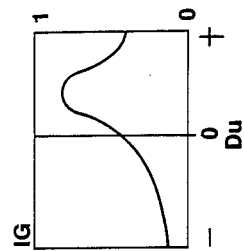
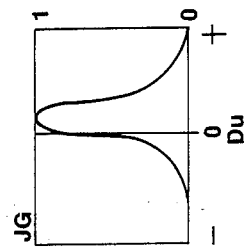
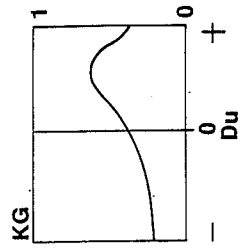
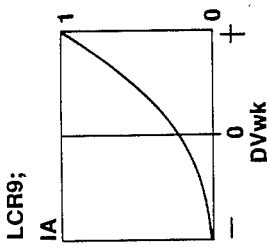
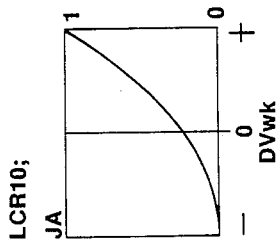
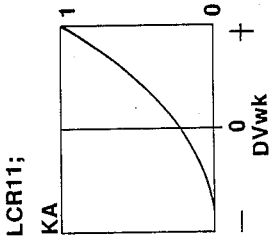
FIG.12  FIG.13  FIG.14

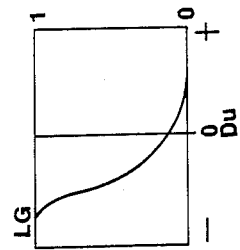
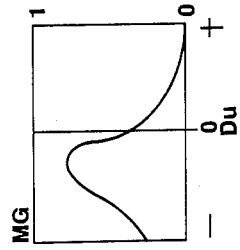
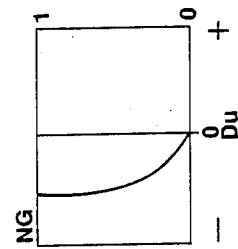

FIG. 18
LCR15;
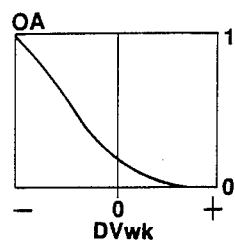
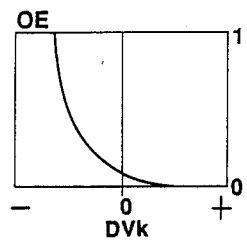
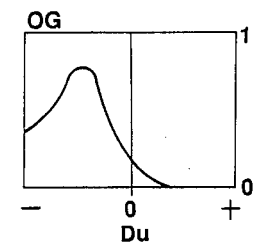
FIG. 19
LCR16;
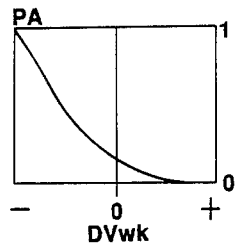
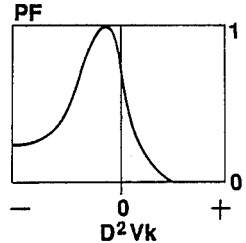
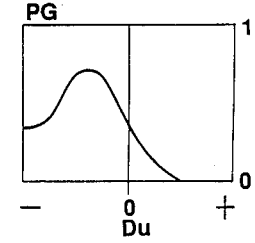
FIG. 20
LCR17;
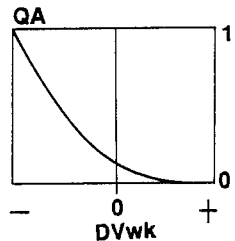
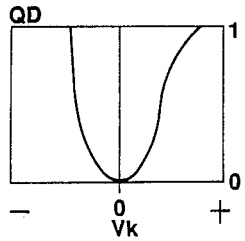
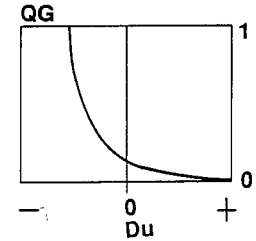
FIG. 21
LCR18;
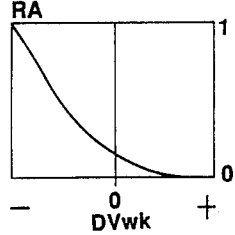
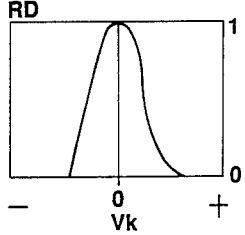
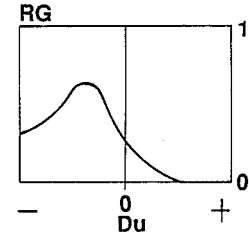

ANTISKID BRAKE CONTROL SYSTEM BASED ON FUZZY INFERENCE

BACKGROUND OF THE INVENTION

The present invention relates to an antiskid brake control system (or a wheel slip brake control system) for a vehicle, and more specifically to an antiskid brake control system arranged to improve the control performances by the application of a fuzzy control.

FIG. 24 shows a conventional antiskid brake system (Japanese patent post-examination publication No. 51-6305). The antiskid brake system of this conventional example includes a vehicle body acceleration sensor 1, a front wheel speed sensor 2, a rear wheel speed sensor 3, a front wheel control unit 4, and a rear wheel control unit 5. Each of the control units 4 and 5 determines a manipulated quantity, such as a brake fluid pressure, in accordance with the sensed vehicle body acceleration DV, the sensed wheel speed Vw of each wheel, and other control parameters, such as vehicle body speed V, and wheel acceleration DVw, obtained by calculation from DV and Vw. Each of the control unit 4 and 5 controls the braking force by sending a control signal representing the manipulated quantity to a wheel cylinder 6 or 7.

As shown by solid lines in FIG. 25, a coefficient $\mu$ of friction between a road surface and a wheel of a moving vehicle varies in dependence on a slip rate $\lambda$. The slip rate $\lambda$ is expressed by a relationship between the vehicle speed V and the wheel speed Vw $[\lambda=(V-Vw)/V]$. The friction coefficient becomes greatest in a zone around $\lambda=0.2$. The slip rate at which the friction coefficient becomes greatest is approximately constant without distinction between a high friction road such as a dry paved road and a low friction road such as snow-covered road. Therefore, it is possible to always hold the friction coefficient near the maximum and to reduce the stopping distance by controlling the braking force so that the slip rate always remains approximately equal to 0.2. On the other hand, the cornering force of a wheel of a turning vehicle becomes smaller with increase of the slip rate, as shown by broken lines in FIG. 25, so that the directional control of the vehicle becomes more difficult with increase of the slip rate. Therefore, it is desirable to hold the slip rate equal to about 0.2 in order to brake and stop a vehicle safely and effectively.

Such a target is achieved in the conventional antiskid brake system as follows; Each of the control units 4 and 5 has a table TBL including values $u_1-u_n$ of the manipulated quantity, and determines the manipulated quantity by obtaining one of the values, corresponding to the wheel acceleration DVw and the slip rate $\lambda$. When the brake is applied heavily, and the wheel speed Vw decreases rapidly, then the wheel acceleration DVw is increased in the minus direction, the slip rate is increased, and the tendency of the wheel to skid is increased. Therefore, the control unit 4 or 5 decreases the brake fluid pressure by choosing a low value ($u_8$, for example) and sending a control signal representing the selected value to the wheel cylinder 6 or 7. Therefore, the wheel speed Vw is increased again, and the slip rate is restored to the zone around 0.2. When the wheel is accelerated by decrease of the brake fluid pressure, and the wheel acceleration DVw exceeds a predetermined value, then the control unit increases the brake oil pressure again in accordance with the slip rate. Thus, the antiskid brake system holds the average slip rate approximately equal to 0.2 by increasing and decreasing the brake actuating force repeatedly.

However, the conventional antiskid brake system is arranged to determined the brake oil pressure by using the table TBL in which the entire range of each of the wheel acceleration DVw and the slip rate is divided into a plurality of divisions. Therefore, the brake fluid pressure is changed in a stepwise manner, and accordingly the accuracy of control is not sufficiently high. It is possible to improve the accuracy by making the divisions of the wheel acceleration and the slip rate smaller, and increasing the number of the divisions. However, the accuracy of the conventional control system is limited by the accuracy in measurement of the slip rate. The slip rate is calculated by using the vehicle speed V relative to the ground. However, it is difficult to directly sense the ground speed. Usually, the ground speed is estimated from the difference between the front wheel speed and the rear wheel speed, or the vehicle acceleration DV, and the accuracy of the lip rate is not so high.

SUMMARY OF THE INVENTION

It is an object of the present invention to provide an accurate antiskid brake control system arranged to adjust a brake fluid pressure or some other manipulated quantity continuously and finely.

As schematically shown in FIG. 1, an antiskid brake control system according to the present invention comprises sensing means preparing means, fuzzy inference means and modulator means. The sensing means senses behaviors of a body and at least one of wheels of a vehicle, and the preparing means prepares parameters which are variable quantities representing the behaviors of the vehicle body and the wheel or wheels. For example, the parameters are wheel speed, vehicle body speed, wheel slip rate, first and second derivatives of the wheel speed with respect to time, and first and second derivatives of the vehicle body speed with respect to time. The fuzzy inference means stores predetermined membership functions each of which is a function of one of the parameters, determines values of the membership functions by using the parameters, and determines a manipulated quantity such as a brake fluid pressure in accordance with the values of the membership functions. The modulator means varies an actual brake actuation force applied to the controlled wheel in accordance with the manipulated quantity.

BRIEF DESCRIPTION OF THE DRAWINGS

FIGS. 4–21 are graphs of membership functions employed in the embodiment.

DETAILED DESCRIPTION OF THE INVENTION

FIGS. 2-23 show an antiskid brake control system (a wheel slip brake control system) of one embodiment of the present invention.

Figure 1:
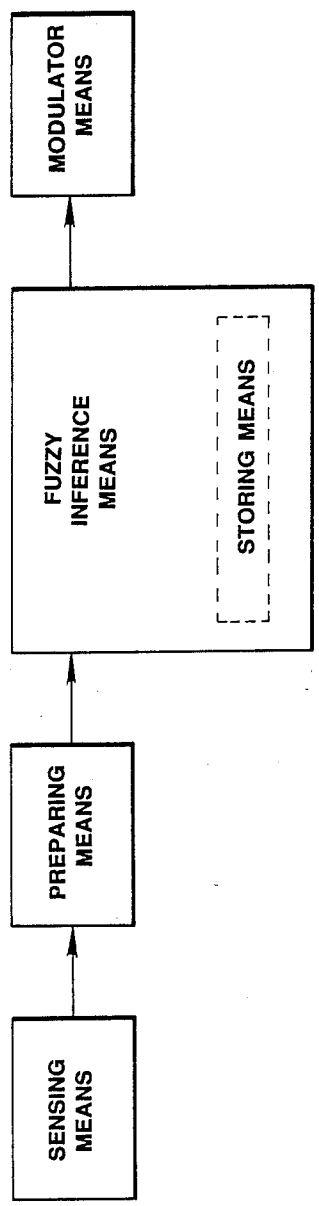
FIG. 1 is a block diagram showing a basic arrangement of an antiskid brake control system of the present invention.
Figure 2:
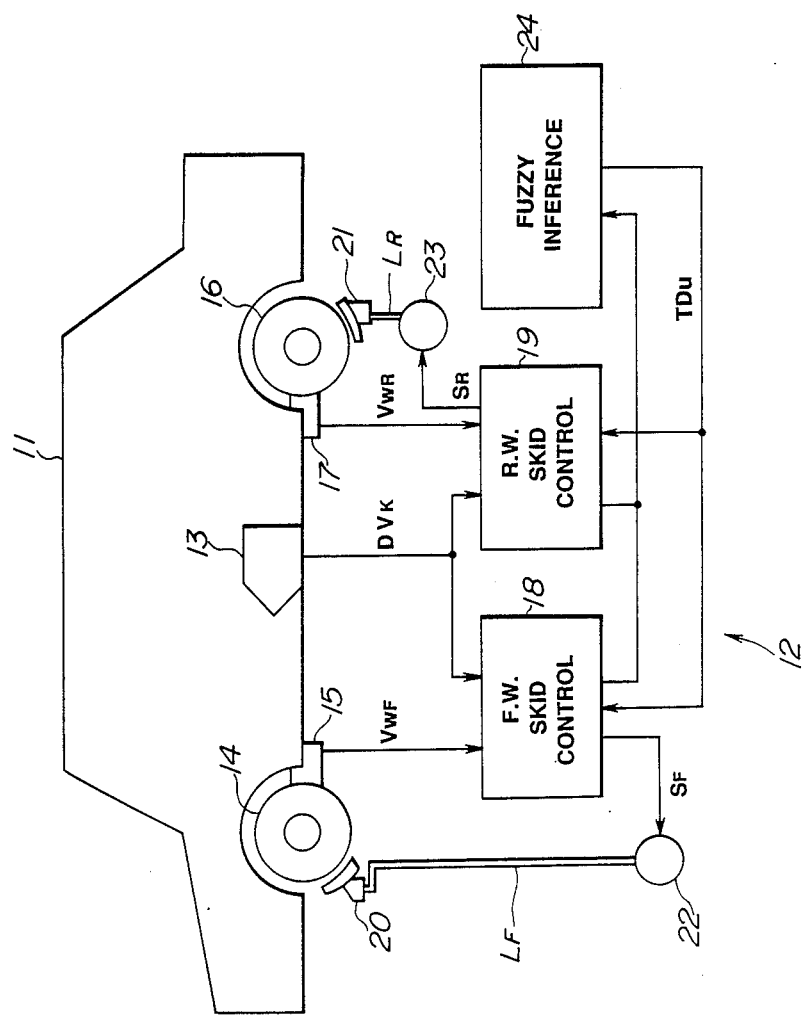
FIG. 2 is a schematic view of a vehicle equipped with an antiskid brake control system of one embodiment of the invention.

A vehicle shown in FIG. 2 includes a vehicle body 11, and an antiskid brake control system 12. The antiskid brake system 12 includes an acceleration sensor 13 for sensing a vehicle body acceleration $DV_k$ in the longitudinal direction of the vehicle body 11, at least one front wheel speed sensor 15 for sensing a front wheel speed $Vw_k$ of at least one of front wheels 14, at least one rear wheel speed sensor 17 for sensing a rear wheel speed $Vw_k$ of at least one of rear wheels 16, and a control unit which includes a front wheel skid control section 18, a rear wheel skid control section 19, and a fuzzy inference section 24. There are further provided front wheel cylinders 20, rear wheel cylinders 21, at least one front wheel pressure supply section 22, and at least one rear wheel pressure supply section 23. Each of the front wheel antiskid control section 18 and the rear wheel antiskid control section 19 computes an estimated vehicle body speed $V_k$, a time rate of change of the vehicle body acceleration $D^2V_k$, a wheel acceleration $DVw_k$ and a time rate of change of the wheel acceleration $D^2Vw_k$ by using the sensed vehicle body acceleration $DV_k$, and the sensed wheel speed $Vw_k$. Each skid control section 18 or 19 further computes a slip rate $\lambda_k$ of at least one wheel, and sends these parameters representing behaviors of the vehicle body and the wheels to the fuzzy inference section 24. From these parameters, the fuzzy inference section 24 determines a manipulated quantity TDu for each wheel. In accordance with the manipulated quantities the front wheel and rear wheel skid control sections 18 and 19 produces brake actuation signals $S_F$ and $S_R$, respectively. The front wheel pressure supply section 22 increases or decreases the brake fluid pressure in accordance with the magnitude of the brake actuation signal $S_F$, and supplies the controlled brake fluid pressure to the front wheel cylinder 20 through a passage $L_F$. Similarly, the rear wheel pressure supply section 23 controls the brake fluid pressure in accordance with the magnitude of the brake actuation signal $S_R$, and supplies the controlled fluid pressure to the rear wheel cylinder 21 through a passage $L_R$.

The fuzzy inference section 24 is based on a fuzzy theory which treats the human, subjective "ambiguity (or uncertainty)". The "ambiguity" is expressed by a fuzzy set, which is a set whose boundary is not definite. The degree to which each member belongs to the set, or the degree of ambiguity, is expressed by a quantity which is any real number from 1 to 0. This quantity is called a membership function, and its value is called a membership value.

In a fuzzy control using the fuzzy theory, control operations are performed in accordance with ambiguous rules expressed by language (so-called language control rules). In general, the fuzzy control is suitable to systems which are difficult to reduce to mathematical models. The conventional PID control and the modern control theory are appropriate when the controlled system is clear and definite. However, in the antiskid control, there exist, as disturbances, various uncertain factors such as changes in vehicle dynamic characteristics due to changes in the load of the vehicle, and the vehicle maintenance conditions, and changes in road surface conditions and weather conditions. Therefore, it is difficult or impossible to compensate all these disturbances by the PID control or the like without making the control system too complicated, and degrading the response characteristic.

It is possible for a skilled driver to safely stop a car even on a low friction road surface without the aid of an antiskid brake control system. In this case, the skilled driver makes various judgements with some ambiguity on the basis of his experiences in driving on snow-covered and frozen roads. The driver must have enough experiences, familiarity with the vehicle, and superior reflexes, in order to safely stop the vehicle on a road of a low friction coefficient. The control system of this embodiment is arranged to obtain a braking performance comparable to that of a highly skilled driver by expressing information corresponding to the technique of the skilled driver by membership functions, and describing the ambiguous criterions of judgements in the form of language control rules. In this control system, the control accuracy and reliability are improved beyond the level of the skilled drivers because human weaknesses such as fatigue and mental disquietude are removed.

The control system of this embodiment employs eighteen language control rules LCR1-LCR18. For each language control rule, membership functions are prepared by using data obtained by simulation or experiment with an actual vehicle. These membership functions are stored in the fuzzy inference section 24 in the form of function tables.

The language control rules LCR1-LCR18 employed in this embodiment are as follows: Each language control rule is expressed in a statement "If (an antecedent), then (a consequent)", or a statement "If (a first antecedent) and (a second antecedent), then (a consequent)".

LCR1; If $DVw_k$ is negative and great in magnitude irrespective of sign, then Du is negative and great in magnitude irrespective of sign.

LCR2; If $DVw_k$ is positive and great in magnitude, then Du is positive and great.

LCR3; If $D^2Vw_k$ is negative and great in absolute value, then Du is negative and medium in absolute value.

LCR4; If $D^2Vw_k$ is positive and great, then Du is positive and medium.

LCR5; If $DVw_k$ is positive, and $\lambda_k$ is small, then Du is positive and great.

LCR6; If $DVw_k$ is positive, and $\lambda_k$ is great, then Du is positive and small.

LCR7; If $DVw_k$ is positive, and $DV_k$ is negative and small in absolute value, then Du is positive and small.

LCR8; If $DVw_k$ is positive, and $DV_k$ is negative and great in absolute value, then Du is positive and medium.

LCR9; If $DVw_k$ is positive, and $D^2V_k$ is negative and small in absolute value, then Du is positive and medium.

LCR10; If $DVw_k$ is positive, and $V_k$ is great, then Du is positive and small.

LCR11; If $DVw_k$ is positive, and $V_k$ is small, then Du is positive and medium.

LCR12; If $DVw_k$ is negative, and $\lambda_k$ is great, then Du is negative and great.

LCR13; If $DVw_k$ is negative, and $\lambda_k$ is small, then Du is negative and small in absolute value.

LCR14; If $DVw_k$ is negative, and $DV_k$ is negative and small in absolute value, then Du is negative and great in absolute value.

LCR15; If $DVw_k$ is negative, and $DV_k$ is negative and great in absolute value, then Du is negative and medium in absolute value.

LCR16; If $DVw_k$ is negative, and $D^2V_k$ is negative and small in absolute value, then Du is negative and medium in absolute value.

LCR17; If $DVw_k$ is negative, and $V_k$ is great, then Du is negative and great in absolute value.

LCR18; If $DVw_k$ is negative, and $V_k$ is small, then Du is negative and medium in absolute value.

Figure 3:
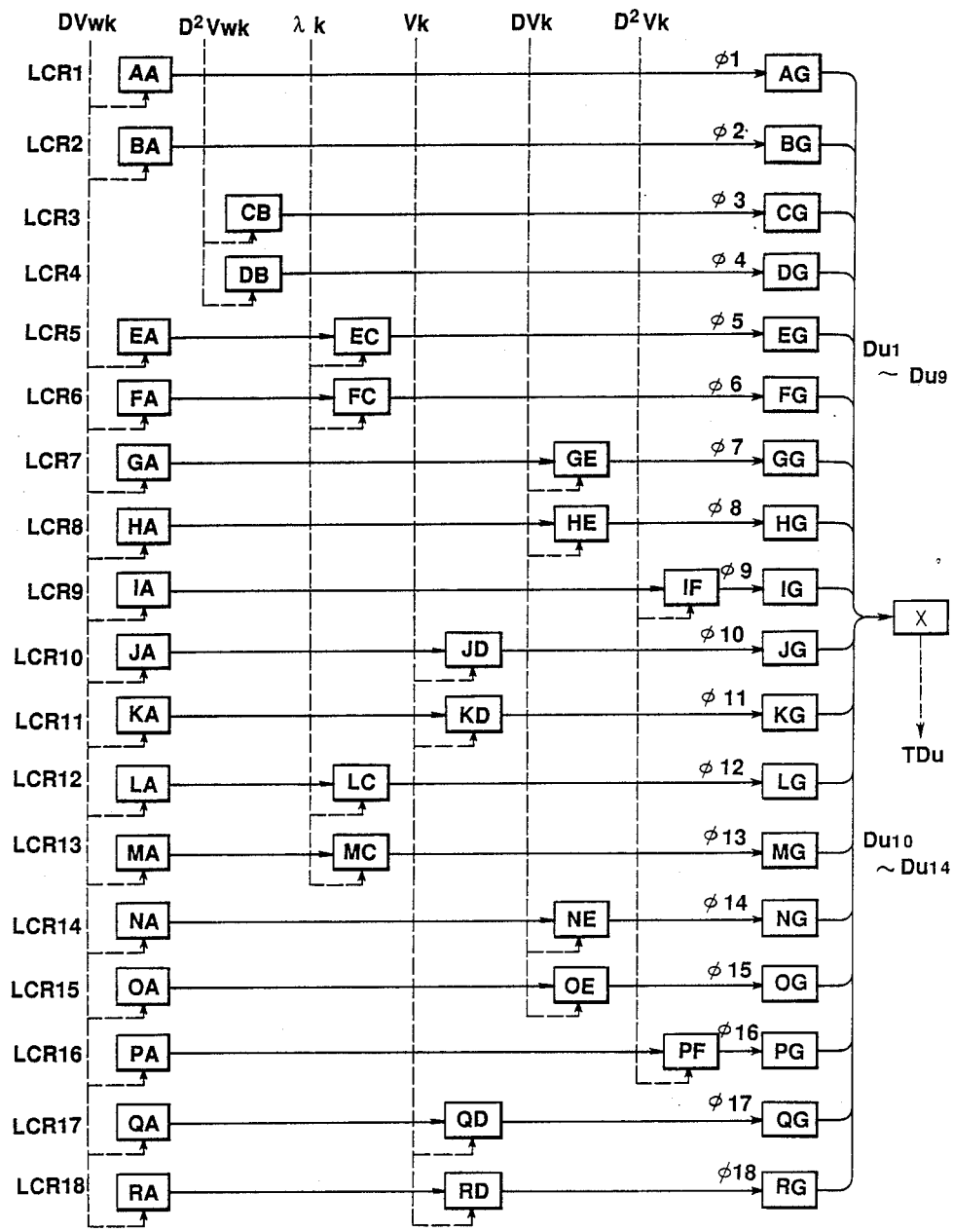
FIG. 3 is a diagram showing connections among function tables used in the embodiment shown in FIG. 2.

FIG. 3 diagramatically shows connections among the function tables in the fuzzy inference section 24. In the diagram of FIG. 3, there are eighteen rows, from a row A to a row R, and seven columns, from a column A to a column G. Each of the eighteen rows corresponds to a unique one of the eighteen language control rules LCR1-LCR18. The first six columns A-F correspond to the antecedents of the language control rules. The last column G corresponds to the consequents. One of the input variables $DVw_k$, $D^2Vw_k$, $\lambda_k$, $V_k$, $D^2V_k$) is inputted into each of the antecedent function tables corresponding to the antecedents. Each antecedent C function table provides a membership value $\phi$ corresponding the input variable. In each row, the consequent function table corresponding to the consequent is clamped by the membership value $\phi$ determined by the antecedent function table corresponding to the antecedent, and a quantity Du is obtained from the consequent function table. The quantity Du is indicative of a degree to which the language control rule holds. The quantities $Du_1$-$Du_{18}$ from the eighteen rows are collected in a table X, and a final quantity TDu is determined by harmonizing the results of the eighteen language control rules. For example, the final quantity TDu is determined by finding a center of gravity. The thus-determined final quantity TDu is sent to the front wheel skid control section 18 or the rear wheel skid control section 19.

FIGS. 4-21 show the membership functions employed in this embodiment. In each graph, the vertical y-axis expresses a degree of certainty, which assumes any real number from "1" to "0", and varies continuously between "1" and "0". The horizontal x-axis expresses the input variable in each of the antecedent membership functions of the columns A-F. In each of the consequent membership functions of the column G, the horizontal axis expresses the quantity Du which is the amount of change in the manipulated quantity.

Figure 4:
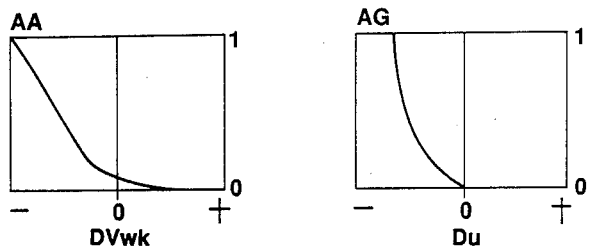
Figure 5:
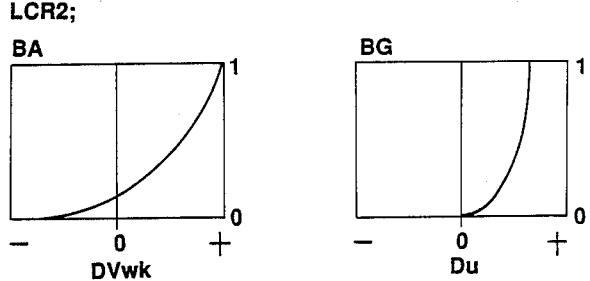
Figure 6:
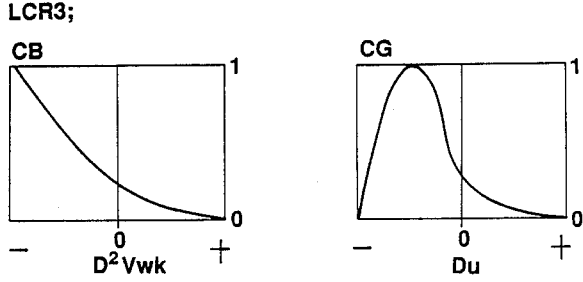
Figure 7:
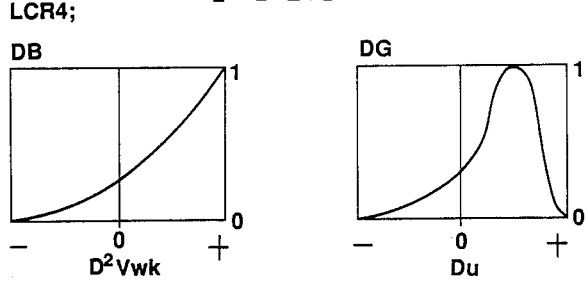
Figure 8:
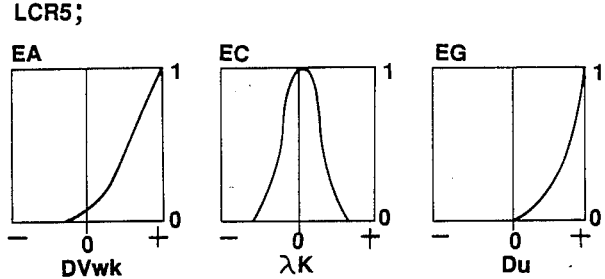
Figure 9:
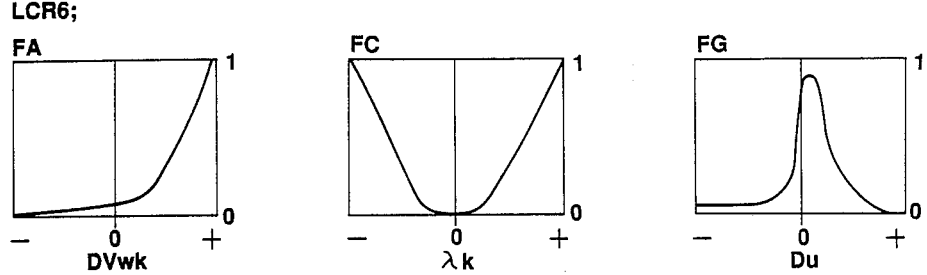
Figure 10:
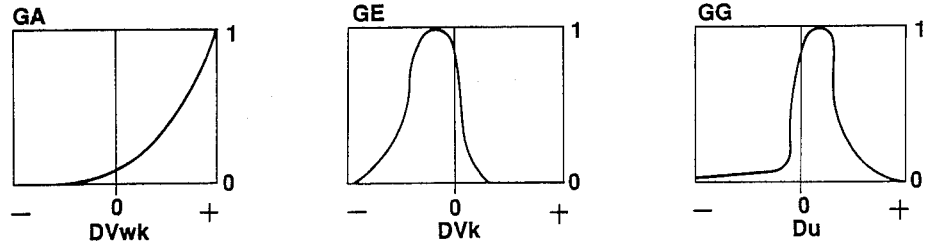
Figure 11:
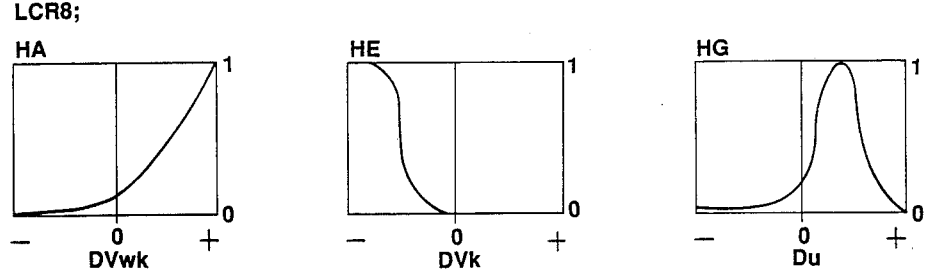
Figure 15:
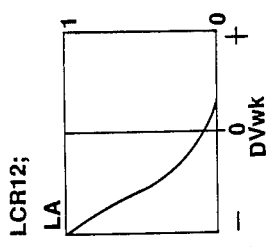
Figure 16:
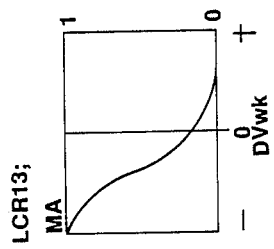
Figure 17:
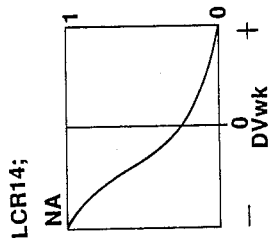

FIG. 4 shows an antecedent membership function (function table) AA corresponding to the antecedent of LCR1, and a consequent membership function AG corresponding to the consequent of LCR1. FIG. 5 shows antecedent and consequent membership functions BA and BG of LCR2. FIG. 6 shows antecedent and consequent membership functions CB and CG of LCR3. FIG. 7 shows antecedent and consequent membership functions DB and DG of LCR4. FIG. 8 shows a first antecedent membership function EA corresponding to the first antecedent of LCR5, a second antecedent membership function EC corresponding to the second antecedent of LCR5, and a consequent membership function EG corresponding to the consequent of LCR5. Similarly, FIG. 9 shows membership functions FA, FC and FG of LCR6. FIG. 10 shows membership functions GA, GE and GG of LCR7. FIG. 11 shows membership functions HA, HE and HG of LCR8. FIG. 12 shows membership functions IA, IF and IG of LCR9. FIG. 13 shows membership functions JA, JD and JG of LCR10. FIG. 14 shows membership functions KA, KD and KG of LCR11. FIG. 15 shows membership functions LA, LC and LG of LCR12. FIG. 16 shows membership functions MA, MC and MG of LCR13. FIG. 17 shows membership functions NA, NE and NG of LCR14. FIG. 18 shows membership functions OA, BE and OG of LCR15. FIG. 19 shows membership functions PA, PF and PG of LCR16. FIG. 20 shows membership functions QA, QD and QG of LCR17. FIG. 21 shows membership functions RA, RD and RG of LCR18.

The curve of each membership function is smooth and continuous, and shaped like a downward slope, or an upward slope, or a peak, or a valley. For example, the membership function AA decreases monotonically from 1 to 0 when $DVw_k$ increases from a negative limit value to a positive limit value. The membership function BA increases monotonically from 0 to 1 when $DVw_k$ increases from the negative limit value to the positive limit value. The membership function CG shown in FIG. 6 is shaped like a peak, and becomes greatest and reaches one when Du is greater a negative limit value and smaller than zero.

Figure 22:
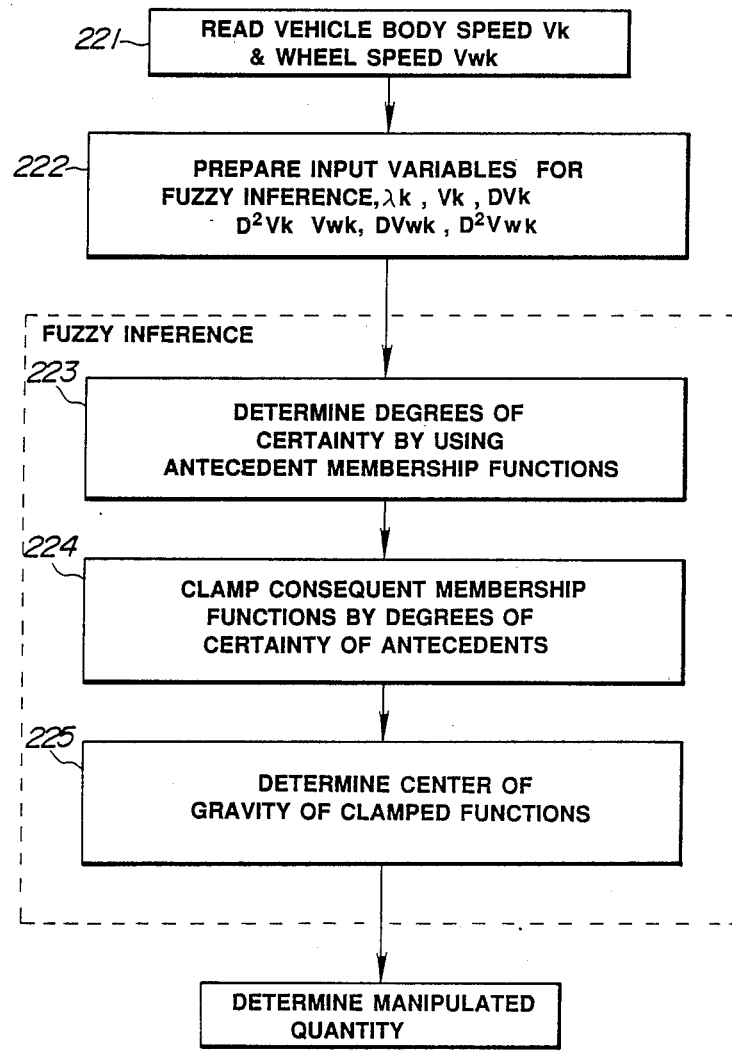
FIG. 22 is a flowchart showing a control process of the embodiment.

FIG. 22 shows a control process of this embodiment. At a step 221, the control unit reads the vehicle body speed $V_k$, and the wheel speed $Vw_k$ of the wheel currently being examined. At a step 222, the control unit calculates the input variables, such as the slip rate $\lambda_k$, the first derivative $DV_k$ of the vehicle speed with respect to time, the second derivative $D^2V_k$ of the vehicle speed with respect to time, the first derivative $DVw_k$ of the wheel speed with respect to time, and the second derivative $D^2Vw_k$ of the wheel speed with respect to time, by using the current values $V_k$ and $Vw_k$ of the vehicle body speed and the wheel speed. These input variables are sent to the fuzzy inference section 24, and the fuzzy inference is performed at steps 223-225. At the step 223, the fuzzy inference section 24 determines values (membership values) $\phi_1$-$\phi_{18}$ of the antecedent membership functions of the eighteen LCRs by using the values of the input variables. The nth membership value $\phi_n$ represents the degree to which the antecedent of the nth language control rule LCRn is true. When there are two antecedents in the nth language control rule, then the nth membership value $\phi_n$ is set equal to the smaller of the two membership values of the first and second antecedent membership functions. At the step 224, the fuzzy inference section 4 clamps the consequent membership functions AG-RG, respectively, by the antecedent membership values $\phi_1$-$\phi_{18}$. At the step 225, the fuzzy inference section 24 determines the final quantity TDu by determining a center of gravity of the clamped consequent membership functions.

Figure 23:
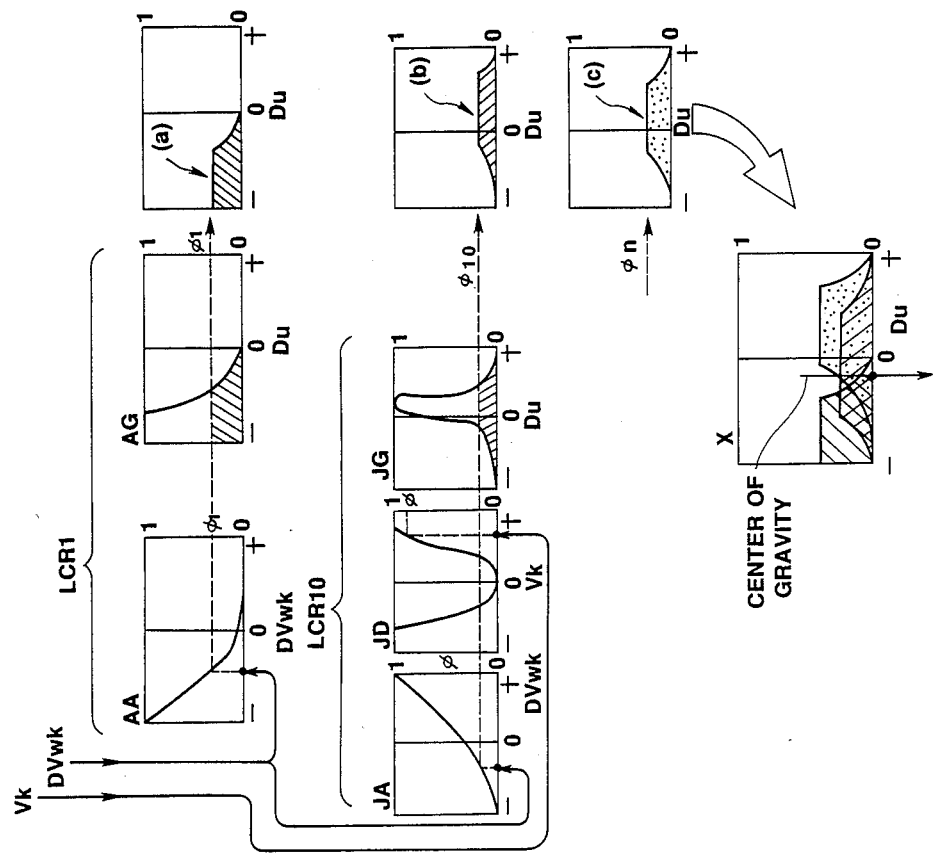
FIG. 23 is a schematic view for illustrating a process of a fuzzy inference employed in the embodiment.
Figure 24:
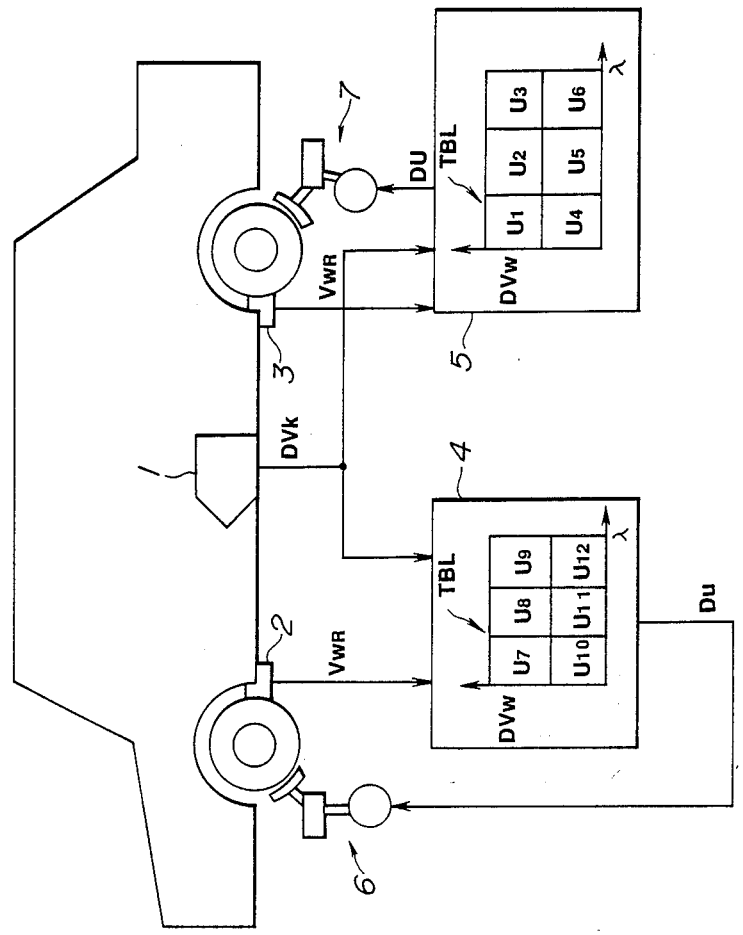
FIG. 24 (prior art) is a schematic view showing one conventional example of an antiskid brake control system.
Figure 25:
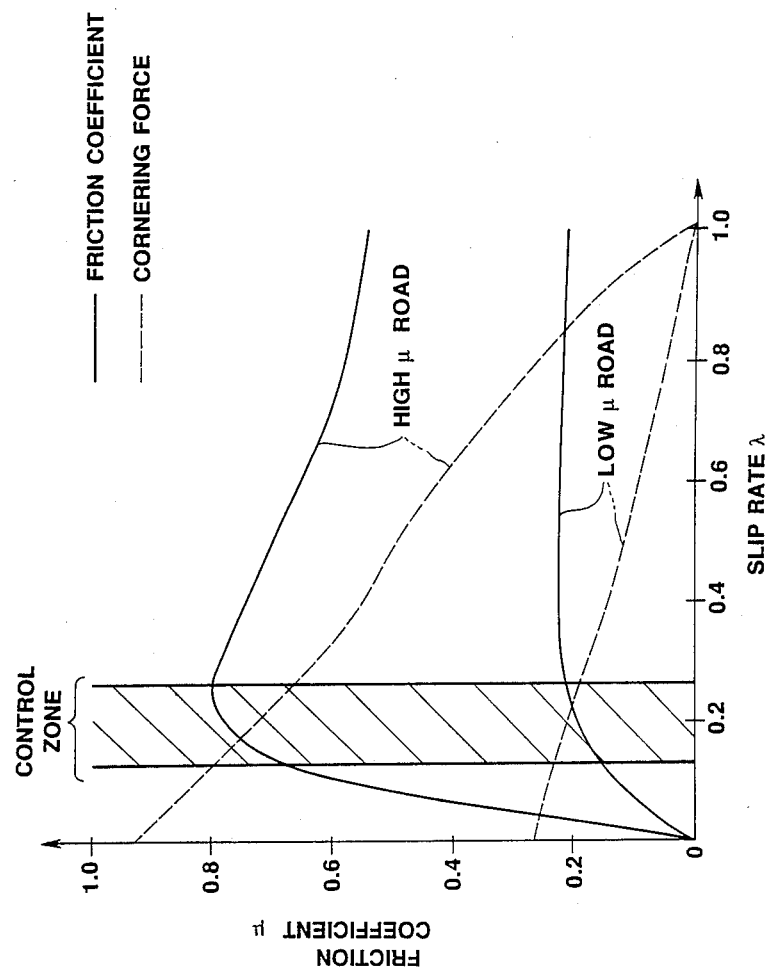
FIG. 25 (prior art) is a graph showing relationships between a slip rate "lambda" and a friction coefficient "mu".

FIGS. 23 shows the process of the steps 223-225, in the form of graphs. In FIG. 23, the LCRs 1 and 10 are taken as examples.

The rule LCR1 stipulates

"If $DVw_k$ is negative and great in absolute value, then Du is negative and great in absolute value". In other words, LCR1 requires that, if the first derivative $DVw_k$ of the wheel speed is great in the direction of deceleration, then the manipulated quantity should be greatly decreased. The possibility of skid of a wheel is high when the deceleration of the wheel is high. Therefore, the LCR1 requires the brake control system to rapidly regain the wheel speed by greatly decreasing the brake fluid pressure and the brake actuation force.

The rule LCR10 provides "If $DVw_k$ is positive and $V_k$ is great, then Du is positive and small." Therefore, the brake control system is required to slightly increase the manipulated quantity if the wheel speed $Vw_k$ is increasing, and the estimated vehicle speed $V_k$ is high. When the wheel is accelerating and the vehicle speed is high, there is a strong possibility that the wheel is escaping from skid and regaining its speed. Therefore, it is required to slightly increase the brake actuation force by increasing the brake fluid pressure.

The fuzzy inference section 24 determines the membership value $\phi_1$ which is a value of the antecedent membership function AA of LCR1, corresponding to the current value of the $DVw_k$, and the membership value $\phi_{10}$ which is a value of the first antecedent membership function JA of LCR10, corresponding to the current value of the $DVw_k$. In this example, the value of the first antecedent membership function JA is smaller than the value of the second antecedent membership function JD corresponding to the current value of $V_k$, as shown in FIG. 23. Therefore, the tenth membership value $\phi_{10}$ is set equal to the value of the first antecedent membership function JA.

Then, the fuzzy inference section 24 clamps the consequent membership function AG by the first membership value $\phi_1$, as shown by a shaded area (a) in the graph AG of FIG. 23. Similarly, the fuzzy inference section 24 clamps the consequent membership function JG of LCR10 by the tenth membership value $\phi_{10}$, as shown by a shaded area (b) in the graph JG of FIG. 23. The consequent membership function of the nth LCR clamped by the nth membership value $\phi_n$ is shown by a shaded area (c) in FIG. 23.

The clamped consequent membership functions of all the language control rules are collected in the table X, and a center of gravity is determined, as shown in a graph X of FIG. 23. This center of gravity is a center of gravity of a collection of all the plane figures (a), (b), (c) etc. For example, the plane figure (a) of LCR1 is bounded by a horizontal line at the level of the first membership value $\phi_1$ and the curve of the consequent membership function AG, and formed under the horizontal line and the curve. The plane figures are limited between a predetermined positive limit value of Du and a negative limit value of the same magnitude. The final quantity TDu is set equal to the x-coordinate of the center of gravity, its distance from the y-axis measured in parallel to the x-axis.

Thus, the final quantity TDu is determined by using the degrees of certainty of all the language control rules LCR1–LCR18. Therefore, the control system of this embodiment can provide accurate control performances even when the degree of certainty of some language control rules are not exactly conformable to the actual state.

The degree of certainty of each language control rule is the real number which varies continuously from "1" to "0". Therefore, the control system of this invention can adjust the manipulated quantity continuously and minutely, so that the accuracy of the antiskid brake control is improved.

In the control system of the invention, each of the measured values, such as Vw and V, is treated according to the language control rules in which the degree of ambiguity is taken into account. Therefore, the control system of the invention can provide satisfactory control performances even when the accuracy in measurement of the vehicle speed and the slip rate is not so high.

What is claimed is:

1. An antiskid brake control system for a vehicle, comprising;
   sensing means for sensing behaviors of a vehicle body and a vehicle wheel of the vehicle,
   preparing means connected with said sensing means for determining parameters representing the behaviors of the vehicle body and wheel,
   fuzzy inference means for storing predetermined membership functions each of which is a function of one of said parameters, determining values of said membership functions by using said parameters, and determining a manipulated quantity in accordance with said values of said membership functions, and
   modulator means for varying a brake actuation force applied to said vehicle wheel in accordance with said manipulated quantity.

2. An antiskid brake control system according to claim 1 wherein said preparing means provides, as said parameter, a vehicle body speed, a wheel speed, a slip rate of said wheel, a first derivative of said vehicle body speed with respect to time, a second derivative of said vehicle body speed with respect to time, a first derivative of said wheel speed with respect to time, and a second derivative of said wheel speed with respect to time.

3. An antiskid brake control system according to claim 2 wherein said fuzzy inference means comprises means for storing a plurality of groups of membership functions, each of said groups representing a conditional proposition, and comprising a first antecedent membership function corresponding to an antecedent of said proposition, and a consequent membership function corresponding to a consequent of said proposition, said fuzzy inference means determining values of said antecedent membership functions in accordance with values of said parameters, and determining an output variable from the value of said antecedent membership function by using said consequent membership function in each group, and determining said manipulated quantity from said output variables of said groups.

* * * * *